Dec. 14, 1948.  W. C. LUENEBURG  2,456,134
PRESSURE COOKER COVER STRUCTURE
Filed Oct. 1, 1947
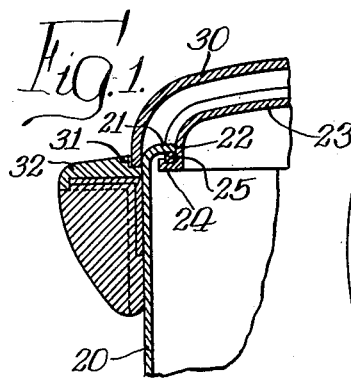
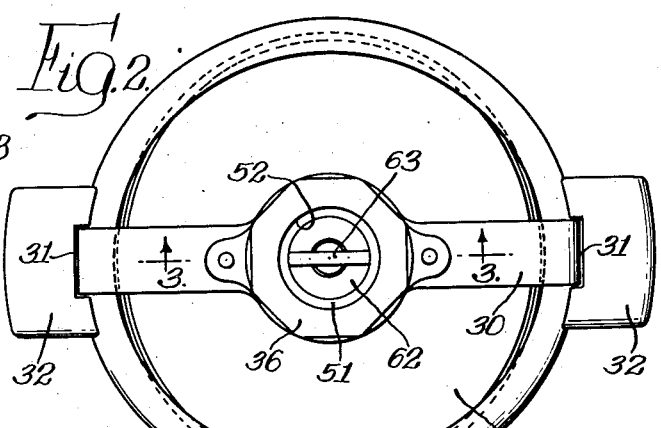
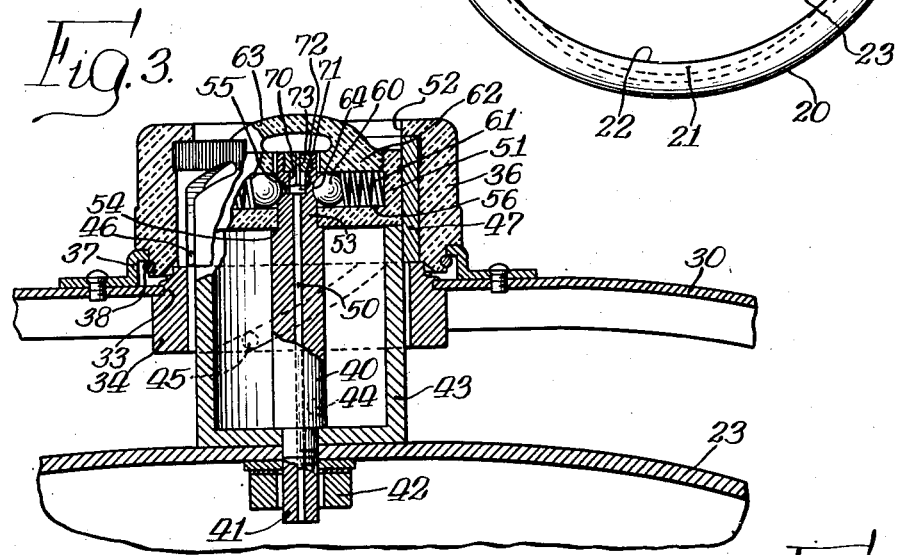
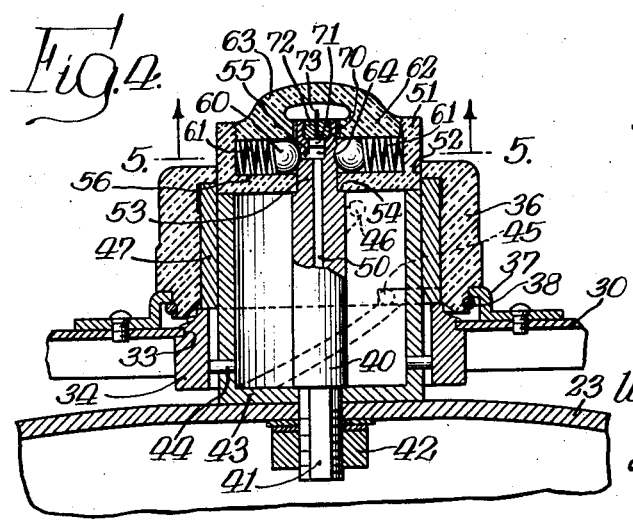
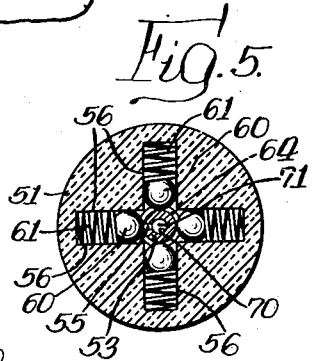
INVENTOR.
Walter C. Lueneburg,
BY
Davis, Lindsey, Hibben & Noyes
Attys.

Patented Dec. 14, 1948

2,456,134

UNITED STATES PATENT OFFICE 2,456,134

PRESSURE COOKER COVER STRUCTURE

Walter C. Lueneburg, Evanston, Ill., assignor to Ekco Products Company, Chicago, Ill., a corporation of Illinois Application October 1, 1947, Serial No. 777,327

10 Claims. (Cl. 220—25)

1

The invention relates generally to pressure cookers of the type suitable for home use and more particularly to the cover structure for a cooker of this type.

A pressure cooker of this type includes means for locking the cover in place on the receptacle to effect a sealing engagement therebetween, as well as means for releasing steam from the receptacle, should the pressure thereof exceed a safe value. In a cooker of the type having an elliptical opening, with the cover removable from and insertable into the receptacle by tilting the cover and rotating it 90° out of alignment with the opening, a bridge member is frequently employed, which carries the cover and spans the top opening of the receptacle, resting at its ends on the top of the receptacle at the periphery thereof. Rotation of the cover, when such a bridge member is employed, is usually effected by a knob or the like mounted centrally on the bridge member. The pressure releasing means, in such case, is usually mounted on the cover at one side of the bridge member, and must be so positioned that it will not strike the bridge member when the cover is rotated 90°, as mentioned above. The area within which such a pressure releasing means may be mounted is thus limited. However, regardless of this fact, the cover lacks a trim appearance with the pressure releasing means positioned at one side of the bridge member.

The general object of the invention is therefore to provide a novel cover structure for a pressure cooker of the above-described type, which combines the cover-operating knob and pressure-releasing means in one trim-appearing part located centrally of the bridge member.

Another object is to provide a novel cover structure having the cover-operating knob and pressure-releasing means combined in one part so that the cover need be perforated at only one point instead of at two, as was heretofore necessary, thus decreasing the chance of undesired leakage of pressure.

A further object is to provide a novel cover structure of the foregoing character, with the valve for release of pressure adjustable so that the pressure maintained in the receptacle may be varied.

Still another object is to provide a novel cover structure of the foregoing character, having combined with the pressure release an indicator for indicating when there is pressure within the receptacle.

Other objects and advantages will become apparent from the following description taken in connection with the accompanying drawings, in which:

Figure 1 is a fragmentary sectional view of a pressure cooker of the character herein referred to and showing the manner in which the cover engages the receptacle.

Fig. 2 is a plan view of the pressure cooker shown in Fig. 1 and provided with a cover structure embodying the features of the invention, the cover being illustrated in a position ready for removal.

Fig. 3 is an enlarged fragmentary sectional view taken on the line 3—3 of Fig. 2.

Fig. 4 is a view similar to Fig. 3 but showing the position of the parts when the cover is in sealing engagement with the receptacle.

Fig. 5 is a sectional view taken on the line 5—5 of Fig. 4.

As heretofore mentioned, the present invention relates to a cover structure for a pressure cooker of the type in which the receptacle has an elliptical top opening, with the cover engageable with the underside of the margin of said opening for sealing the receptacle, and movable therethrough when tilted and rotated 90° out of alignment with the opening. With this type of cooker, a bridge member spanning the top opening of the receptacle is usually employed, and a knob is rotatably mounted centrally of the bridge member, by which the cover may be rotated through the above-mentioned 90°. Such knob also controls the raising and lowering of the cover into and out of engagement with the underside of the margin of the receptacle opening.

The cover of a pressure cooker of this type usually includes a pressure release by which steam may be released from the receptacle, when the cover is closed, to prevent the building up of excessive pressure within the receptacle. The present invention includes as one of its features the incorporation of a pressure release in the knob by which the cover is rotated. Such arrangement provides a neat appearance for the top of the cover, avoiding the use of a pressure release mounted at one side of the cover and necessitating perforation of the cover only at its central point where the knob is connected to the cover. The present invention also includes the feature of making the pressure release adjustable to vary the pressure at which steam is released from the receptacle. Thus, different pressures may be maintained in the receptacle for cooking different foods and, as a consequence thereof, different cooking temperatures may be attained since the temperature at which water boils varies with the pressure to which the water is subjected. There is also incorporated in the pressure release an indicator to indicate to the user the fact that there is a pressure within the receptacle substantially higher than atmospheric pressure. Such indicator is a convenience in timing the cooking of foods since the times recommended for various foods are measured from the time when pressure is first built up within the receptacle.

To illustrate the invention, I have shown in Figs. 1 and 2 a receptacle 20 of generally cylindrical form with the side wall thereof bent inwardly at its upper edge to provide a flange 21. The flange 21 defines an opening 22 adapted to be closed by a cover 23. The flange 21 and the cover 23 are so arranged that the cover extends under the flange to engage the underside thereof, so that steam pressure within the receptacle 20 will tend to cause the cover to move into tight clamping engagement with the flange 21. In the present instance, the cover 23 is provided with an outwardly directed flange 24 (see Fig. 1) at its periphery with a gasket 25 of rubber or the like seated and rigidly secured in the flange 24 to engage the flange 21 when the cover is clamped into position.

In this type of construction, the opening 22, as well as the cover 23, is preferably made elliptical or oval in form, and the cover, when it is to be removed, is rotated 90° out of alignment with the opening 22, as illustrated in Fig. 2, so that the shorter diameter of the cover can pass through the longer diameter of the opening 22. To permit such passage, the cover 23 is tilted and one edge at the extremity of the longer diameter is passed through the opening and the cover thereby removed. This general construction of the cover and the opening which it closes is well known in the art.

In a cooker of this type, a bridge spanning the opening 22 and a knob mounted centrally of the bridge member are employed, the knob controlling the movements of the cover 23. A structure of this character is shown in my copending application Serial No. 745,065, filed April 30, 1947. As shown in more detail in said application, such a structure comprises a bridge member 30 of generally channel shape cross section, spanning the opening 22 and having its ends resting in pockets 31 provided on the receptacle, preferably in the handle portions 32 thereof. At its mid point, the bridge member is provided with an aperture 33 in which is rigidly secured a ring 34.

Mounted above the bridge member centrally thereof is a manually operable element in the form of a knob 36 rotatably mounted thereon by a securing ring 37 and a spring locking ring 38. The knob 36 is thus rotatably mounted on the bridge 30 but is held against vertical movement relative thereto. The knob is preferably made of molded plastic material, which is not a good conductor of heat, so that it will remain relatively cool and therefore may be comfortably grasped by the hand. Mounted within the knob 36 is a stem 40 having a threaded and reduced lower end 41 extending through the cover 23 with the cover secured thereon by means of a nut 42. Interposed between the cover and the shoulder formed by the reduced end 41 is an operating member 43 of cup-shaped form. The operating member 43 is interconnected with the ring 34 and the knob 36 in such a manner that, assuming the cover is out of alignment with the receptacle opening, as shown in Fig. 2, the knob may be turned in one direction to rotate the cover into alignment with the receptacle opening, simultaneously raising the cover toward the margin of said opening and thereafter, by continued rotation of the knob 36, effecting a further upward movement of the cover, without turning it, so that the cover is drawn into tight sealing engagement with the margin of the receptacle opening. To this end, the ring 34 and knob 36 are provided with cam connections with the operating member 43 to effect such movement of the cover.

As is fully disclosed in my copending application, such cam connections comprise three sets of radially extending pins carried on the cylindrical wall of the operating member 43. Thus, I provide a lower set of pins 44, an intermediate set of pins 45, and an upper set of pins 46. The lower set of pins 44 and the intermediate set 45 cooperate with grooves provided in the ring 34, while the upper set of pins 46 cooperate with grooves provided in a sleeve 47 mounted within the knob 36. Such grooves cooperate with the various sets of pins so that, when the knob 36 is turned from the position shown in Figs. 2 and 3 in a clockwise direction, the cover is thereby rotated into alignment with the opening 22 and is simultaneously raised toward its closing position. When the cover is thus moved into alignment with the opening 22, the knob 36 may be further rotated without rotating the cover 23, and further raising movement of the cover is effected to move it into tight sealing engagement with the flange 21 on the receptacle so that steam pressure may be built up within the receptacle. The parts when in this position are shown in Fig. 4. To open the cover and remove it from the receptacle, the reverse operation is performed. Thus, the knob 36 is rotated counterclockwise, which movement causes the cover to be forced downwardly out of tight engagement with the margin of the receptacle opening without rotating. Further rotation of the knob 36 in a counterclockwise direction lowers the cover still farther and turns it through 90° to the position shown in Fig. 2. The cover, together with the bridge member, may then be tilted to remove it from the receptacle.

The present invention, as heretofore mentioned, includes the feature of incorporating a pressure release in the foregoing structure, that is, in the present instance, within the knob 36. In this connection, it is to be understood that the invention is not limited to the particular cover operating structure herein shown, but is applicable to any cover operating structure for a pressure cooker of this type, which includes a knob similar to the knob 36.

The pressure release in the present instance is mounted on the upper end of the stem 40, the latter being provided with an internal vertically extending passage 50 communicating at its lower end with the interior of the receptacle so that the pressure of the steam within the receptacle will extend upwardly through the passage 50. The pressure release is in the form of a spring-operated valve and comprises, in the present instance, a disc member 51 herein shown as having the same outside diameter as the operating member 43 and adapted to project through an aperture 52 in the top of the knob 36 when the cover is closed. To position the disc member 51, the upper end of the stem 40 has a reduced portion 53 providing a shoulder 54 on which the disc member 51 is seated. The upper end of the passage 50 is provided with a lateral opening 55, and the disc member is provided with a plurality of radial grooves 56 adapted to be aligned with the lateral opening 55 by rotation of the disc member 51 on the stem 40. Mounted in each groove is a ball 60, spring-pressed into engagement with the reduced end 53 of the stem 40 by springs 61 positioned in the outer portion of the grooves 56. The balls 60, as they are moved around the reduced end 53 of the stem 40 by rotation of the disc member 51, will thereby be successively pressed into closing engagement with the lateral opening 55 when aligned therewith, to prevent escape of steam from the interior of the receptacle. When steam builds up to sufficient pressure to overcome the closing pressure exerted by the spring 61, the associated ball will be forced outwardly to permit escape of steam and consequent reduction of pressure within the receptacle. The various springs 61 are preferably made of different spring constants so that variable pressures may be held within the receptacle, depending upon which ball is seated in the lateral opening 55.

The balls 60 and springs 61 are held in their respective grooves 56 by a closure member 62 in the form of a plug threaded into the disc member 51. The closure member 62 is preferably provided with a handle portion 63 extending diametrically across its top, by which the disc member 51 may be rotated on the upper end of the stem 40 to bring the respective balls 60 selectively into engagement with the lateral opening 55. The balls 60 also serve the function of holding the disc member 51 on the reduced end 53 of the stem 40 but permitting rotation of the disc member. To this end, the reduced upper end 53 of the stem 40 is provided with an annular groove 64 in which all of the balls 60 are seated. The groove 64 is located in the same plane as the lateral opening 55 and serves in the nature of a race for the balls as the disc member 51 is rotated. The balls thus permit rotation of the disc member 51 but yieldably hold it against endwise movement relative to the reduced upper end 53 of the stem 40.

The invention also includes as one of its features an indicator by which a user may determine when steam pressure above atmospheric pressure exists within the receptacle. For this purpose, the upper end of the passage 50 in the stem 40 is enlarged as at 70, and within the enlarged portion 70 is mounted a plunger 71. The plunger is held within the enlarged portion 70 by means of a plug 72 threaded in a counterbore in the upper end of the reduced portion 53 of the stem 40. The plug 72 is provided with a central aperture through which a shank 73 on the plunger extends. The shank 73 is of such length that when no pressure exists in the passage 50 and the plunger 71 is at the lower end of the enlarged portion 70, the upper end of the shank 73 lies entirely within the plug 72. However, as soon as there is sufficient pressure in the receptacle to raise the plunger in the enlarged portion 70, the shank 73 projects beyond the end of the plug, as illustrated in Fig. 4, and is visible under the handle 63.

With the foregoing structure, the top of the pressure cooker has a trim appearance, since the pressure release is incorporated within the knob 36. The particular pressure release disclosed herein is adjustable to permit different pressures to be held within the receptacle, and by varying the pressure maintained within the receptacle, different cooking temperatures may be obtained, which feature is desirable in cooking different types of foods. The indicator provides a positive indication, clearly visible by the user, to show when pressure is first built up within the receptacle, so that cooking times may be started from the moment the indicator shows the presence of pressure within the receptacle.

I claim:

1. In a pressure cooker comprising a receptacle having an elliptical top opening and a cover with the latter engageable with the underside of the margin of said opening and movable therethrough when tilted and rotated 90° out of alignment with the opening, a bridge adapted to rest at its ends on the receptacle, a cover-supporting member secured at its lower end to said cover and extending through said bridge, a knob mounted over said bridge and rotatably supported thereby and cooperating with said cover-supporting member to rotate the cover, said knob controlling the raising and lowering of the cover into and out of engagement with said margin, said cover-supporting member having a passage communicating with the interior of the receptacle, and a pressure release mounted in said knob and connected to said passage for releasing steam from the receptacle when a predetermined pressure is reached.

2. In a pressure cooker comprising a receptacle having an elliptical top opening, a cover engageable with the underside of the margin of said opening and movable therethrough when tilted and rotated 90° out of alignment with the opening, a bridge adapted to rest at its ends on the receptacle, a knob mounted over said bridge and rotatably supported thereby and controlling the raising and lowering of the cover into and out of engagement with said margin, and a cover-supporting member cooperating with said knob to rotate the cover and having a passage communicating with the interior, the combination therewith of a spring-operated valve mounted within said knob and normally closing said passage, said valve being adapted to open said passage to permit escape of steam from the receptacle when a predetermined pressure is reached.

3. In a pressure cooker comprising a receptacle having an elliptical top opening, a cover engageable with the underside of the margin of said opening and movable therethrough when tilted and rotated 90° out of alignment with the opening, a bridge adapted to rest at its ends on the receptacle, a knob mounted over said bridge and rotatably supported thereby and controlling the raising and lowering of the cover into and out of engagement with said margin, and a cover-supporting stem secured at its lower end to the cover and cooperating with said knob to rotate the cover, said stem having a vertical passage communicating at its lower end with the interior of the receptacle and having a lateral opening at its upper end, the combination therewith of a valve-carrying member mounted within said knob, and a spring-pressed ball mounted in said member and seated in said lateral opening to close said passage, said ball being adapted to open said passage to permit escape of steam from the receptacle when a predetermined pressure is reached.

4. In a pressure cooker comprising a receptacle having an elliptical top opening, a cover engageable with the underside of the margin of said opening and movable therethrough when tilted and rotated 90° out of alignment with the opening, a bridge adapted to rest at its ends on the receptacle, an annular knob mounted over said bridge and rotatably supported thereby and controlling the raising and lowering of the cover into and out of engagement with said margin, and a stem secured at its lower end to the cover and cooperating with said knob to rotate the cover, said stem having a passage communicating with the interior of the receptacle, the combination therewith of a disc member mounted on the upper end of said stem within said annular knob, and a spring-operated valve mounted in said disc member and normally closing said passage, said valve being adapted to open said passage to permit escape of steam from the receptacle when a predetermined pressure is reached.

5. In a pressure cooker comprising a receptacle having an elliptical top opening, a cover engageable with the underside of the margin of said opening and movable therethrough when tilted and rotated 90° out of alignment with the opening, a bridge adapted to rest at its ends on the receptacle, a knob mounted over said bridge and rotatably supported thereby and controlling the raising and lowering of the cover into and out of engagement with said margin, and a stem secured at its lower end to said cover and cooperating with said knob to rotate the cover, said stem having a passage communicating at its lower end with the interior of the receptacle and having a lateral opening at its upper end, the combination therewith of a disc member rotatably mounted within said knob, a plurality of balls carried by said disc member and selectively engageable with said lateral opening upon rotation of said disc member, and a plurality of springs of different spring constants cooperating with the respective balls, each ball being adapted when in engagement with said lateral opening to normally close said passage and to open said passage to permit escape of steam from the receptacle when a predetermined pressure is reached.

6. In a pressure cooker comprising a receptacle having an elliptical top opening, a cover engageable with the underside of the margin of said opening and movable therethrough when tilted and rotated 90° out of alignment with the opening, a bridge adapted to rest at its ends on the receptacle, a knob mounted over said bridge and rotatably supported thereby and controlling the raising and lowering of the cover into and out of engagement with said margin, and a stem secured at its lower end to the cover and cooperating with said knob to rotate the cover, said stem having a longitudinal passage communicating at its lower end with the interior of the receptacle and having a lateral opening at its upper end, the combination therewith of a disc member rotatably mounted on the upper end of said stem within said knob and having a plurality of radial grooves adapted to be aligned with said lateral opening by rotation of said disc member, a plurality of balls mounted in the respective grooves and normally closing the lateral opening, a plurality of springs of different spring constants mounted in the respective grooves in engagement with the respective balls, said balls being adapted to be forced away from said lateral opening when predetermined pressures in the receptacle are reached.

7. In a pressure cooker comprising a receptacle having an elliptical top opening, a cover engageable with the underside of the margin of said opening and movable therethrough when tilted and rotated 90° out of alignment with the opening, a bridge adapted to rest at its ends on the receptacle, a knob mounted over said bridge and rotatably supported thereby and controlling the raising and lowering of the cover into and out of engagement with said margin, and a stem secured at its lower end to the cover and cooperating with said knob to rotate the cover, said stem having a longitudinal passage communicating at its lower end with the interior of the receptacle and having a lateral opening at its upper end, the combination therewith of a pressure release mounted within said knob to control the escape of steam from the receptacle through said passage when predetermined pressures in the receptacle are reached, said pressure release comprising a disc member rotatably mounted on the upper end of said stem and having a plurality of radial grooves adapted to be selectively aligned with said lateral opening, spring-pressed balls mounted in said grooves for closing said lateral opening, and a closure member secured in said disc member for closing said grooves and having a handle for rotating the disc member about said stem.

8. In a pressure cooker comprising a receptacle having an elliptical top opening, a cover engageable with the underside of the margin of said opening and movable therethrough when tilted and rotated 90° out of alignment with the opening, a bridge adapted to rest at its ends on the receptacle, a knob mounted over said bridge and rotatably supported thereby and controlling the raising and lowering of the cover into and out of engagement with said margin, and a stem secured at its lower end to the cover and cooperating with said knob to rotate the cover, said stem having a longitudinal passage communicating at its lower end with the interior of the receptacle and having a lateral opening at its upper end, the combination therewith of a pressure release mounted within said knob and normally closing said passage but adapted to open said passage to permit escape of steam from the receptacle at varying pressures therein, said pressure release comprising a manually rotatable disc member rotatably mounted on the upper end of said stem, a plurality of spring-pressed balls mounted in said disc member and spring-pressed into engagement with said stem with the balls selectively engageable with said opening, said stem having an annular groove in which all of said balls are seated whereby said disc member is held against endwise movement relative to said stem but is rotatable thereon to move the balls selectively into engagement with said lateral opening.

9. In a pressure cooker comprising a receptacle having an elliptical top opening, a cover engageable with the underside of the margin of said opening and movable therethrough when tilted and rotated 90° out of alignment with the opening, a bridge adapted to rest at its ends on the receptacle, a knob mounted over said bridge and rotatably supported thereby and controlling the raising and lowering of the cover into and out of engagement with said margin, and a stem secured at its lower end to said cover and cooperating with said knob to rotate the cover, said stem having a longitudinal passage communicating with the interior of the receptacle, the combination therewith of a spring-pressed valve mounted within said knob and normally closing said passage, said valve being adapted to be opened to permit escape of steam from the receptacle when a predetermined pressure in the receptacle is reached, and a pressure indicator subjected to pressure within said passage and having a portion adapted to be projected externally of said valve to indicate the presence of pressure in the receptacle.

10. In a pressure cooker comprising a receptacle having an elliptical top opening, a cover engageable with the underside of the margin of said opening and movable therethrough when tilted and rotated 90° out of alignment with the opening, a bridge adapted to rest at its ends on the receptacle, a knob rotatably mounted on said bridge and controlling the raising and lowering of the cover into and out of engagement with said margin, and a stem secured at its lower end to said cover and cooperating with said knob to rotate the cover, said stem having a longitudinal passage communicating with the interior of the receptacle, the combination therewith of a spring-pressed valve mounted within said knob and normally closing said passage, said valve being adapted to be opened to permit escape of steam from the receptacle when a predetermined pressure in the receptacle is reached, said passage at its upper end having an enlarged portion, and a plunger slidably mounted in said enlarged portion and having a shank portion adapted to be projected beyond the end of said stem by pressure in said receptacle.

WALTER C. LUENEBURG.

No references cited.